Figure 1:
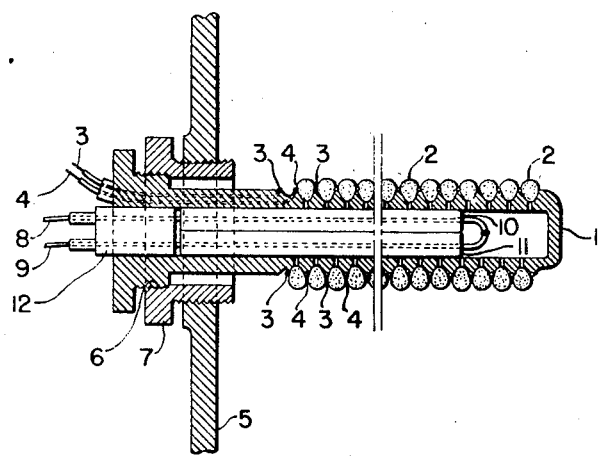

Jan. 17, 1950     H. J. OBERDING     2,494,628
ELECTRIC MOISTURE-TEMPERATURE DEVICE

Filed March 18, 1948

Inventor:
Harold J. Oberding

Patented Jan. 17, 1950

2,494,628

UNITED STATES PATENT OFFICE 2,494,628

ELECTRIC MOISTURE-TEMPERATURE DEVICE

Harold J. Oberding, Gary, Ind., assignor to Universal Oil Products Company, Chicago, Ill., a corporation of Delaware Application March 18, 1948, Serial No. 15,667

5 Claims. (Cl. 201—63)

This invention relates to a method and apparatus for maintaining the proper moisture content of a contact bed of a hygroscopic material being employed in the conversion of a reactant stream. More specifically the improvement relates to means for controlling proper temperature for a given moisture content, or alternately, for controlling the moisture content for a given temperature, within a catalyst contacting bed of a hygroscopic material which must be maintained at special operating conditions of temperature and water content to effect a desired and efficient conversion of the charge stream.

Certain catalytic materials used in the conversion of hydrocarbons in the petroleum refining industry are of a hygroscopic nature. For example, phosphoric acid is used as a polymerization catalyst to effect the conversion of cracked gases, particularly propylene, butylene and other olefinic gases, into high grade motor fuel. The catalytic material is normally employed in a pellet form and is maintained in chambers or reactor tubes through which the reaction stream is charged. In the polymerization process, it is necessary to maintain the proper hydration or moisture content of the bed within relatively narrow limits, for too much moisture causes the hygroscopic material to soften and permit heavy polymers or carbonaceous material from the charge stream to deposit in the bed. On the other hand, if the bed becomes excessively dehydrated, then the catalytic activity of the material decreases and an efficient polymerization of the charge is not obtained.

It is the principal object of this invention to provide an improved method for controlling the moisture content in the contact bed of a hygroscopic material in a manner to effect a more efficient conversion operation for which the contact material is used.

It is also an object of the invention to provide an improved control device suitable for determining a proper moisture content and temperature for the contact material, whereby to prolong the usefulness of the contact bed as well as to provide improved overall efficiency of the conversion operation.

Briefly, the improved method of controlling the temperature and moisture content of the contact bed of hygroscopic material being maintained within a confined reaction zone for use in effecting a particular treating or conversion operation, comprises, providing a pair of separated electrically conductive elements with a portion of the contact material positioned therebetween in a test zone communicative with the feed stream passing to the reaction zone, maintaining a constant electrical potential between the separated conductive elements and causing the hydration of the material between the conductive elements to reach an equilibrium condition with the water vapor in the feed stream, measuring the temperature in this portion at which the current flow therethrough effects the equilibrium condition, and controlling the temperature of the feed stream contact with the bed within the reaction zone to substantially correspond with that temperature obtained in the portion of the material within the test zone whereby to maintain the desired moisture content within the contact bed.

The catalyst or contact material within the reaction zone being of a hygroscopic material will have a varying electrical conductivity and a corresponding varying current flow depending upon the amount of hydration of the contact material. In other words, as the material picks up moisture, more current flows through the portion of the contact material between the electrical elements or wires, the increased current rate heats the material and tends to drive off some of the moisture and eventually a temperature is reached at which the moisture content thereof is in equilibrium with the water vapor and the atmosphere surrounding it. The temperature which is measured or received by a suitable device may then be used to control the particular contacting operation which is being undertaken to maintain the proper temperature for the contact bed itself in view of the particular moisture content of the feed stream. Of course, where the temperature determined in the test zone, as that necessary to maintain the proper hydration of the material, is too high or too low for the correct processing temperature range, then the amount of moisture being charged to the reaction zone, in the feed, or separately, must be decreased or increased to effect a new temperature indication within the test zone and to maintain the feed temperature at that determined in the test zone and which is within the proper treating or conversion temperature range.

The indicating control apparatus of this invention which is used in combination with a contact bed of hygroscopic material, comprises in a simple embodiment, a pair of electrically conductive wires or elements wound around a tubular non-electrical conducting supporting member, the wires being uniformly spaced apart and unconnected, a rope-like wick of the hygroscopic material used in the contact bed, said wick being positioned around the supporting tube and between the pair of spaced wires, in a removable manner, a constant voltage supply to the unconnected pair of wires whereby current will flow from the wires and thru the interposed hygroscopic material in relation to its hydration, temperature sensitive means positioned within the tubular supporting member in a manner to indicate the temperature obtained within the wick of hygroscopic material as a result of the current flow therethrough.

In a preferential installation, the device is placed at the chamber having the contact bed of hygroscopic material in a manner to have a cooled portion of the feed stream contact the wick which is impregnated with the contact material. The feed stream is cooled prior to reaching the temperature measuring device in order to insure that the temperature reading obtained is that which results from the current flow through the wick, and not from an over-heated charge stream to the unit.

The temperature sensitive instrument of the device may be connected to automatic temperature regulating means operating on the feed stream in order to effect a raising or lowering of the feed temperature as may be required. Of course, where the unit is being operated manually then manual adjustment of the heating or cooling means through which the feed stream passes may be adjusted to attain the temperature within the main contact bed which has been indicated by the device, as proper to maintain the vapor pressure of water in the contact bed in equilibrium with the moisture content of the feed stream. Alternately, where adjustment is available for varying the water content of the feed stream then the water content may be varied to obtain the equilibrium at a desired temperature. This latter procedure is of course necessary, where the temperature indicated by the device as optimum is outside the temperature range for the preferred conversion conditions for the particular charge.

A particular advantage of this invention resides in obtaining optimum operating conditions with better yields of conversion products, while still another is obtaining a longer life for the hygroscopic bed of contact material. By obtaining a better or more exact control of the operation, the most satisfactory conversion conditions may be employed in a substantially continuous manner and up-set conditions may be substantially eliminated. In other words, the indicating and control device of the invention and the improved method of operation, provides means for immediately knowing an out of balance condition such that immediate steps will be indicated for manual operation, or will be effected automatically by suitable control instruments.

The temperature measuring and control device as provided as part of this invention also has several advantages over other types of indicators. The unit is compact and designed to be easily mounted in a chamber or conduit at any suitable test zone. The device also has a removable type of wick which makes it possible to replace the hygroscopic material in the instrument should such necessity arise.

Accompanying drawing and the following description thereof will serve to clarify the construction of the device and the operation of this improved method of controlling the temperature and moisture content in a contact bed of hygroscopic material, as well as point out further advantages of the device itself.

Figure 1 of the drawing is a cross sectional view through the instrument which provides the proper temperature to be used for the particular hygroscopic material used in the conversion of a feed stream.

Figure 2:
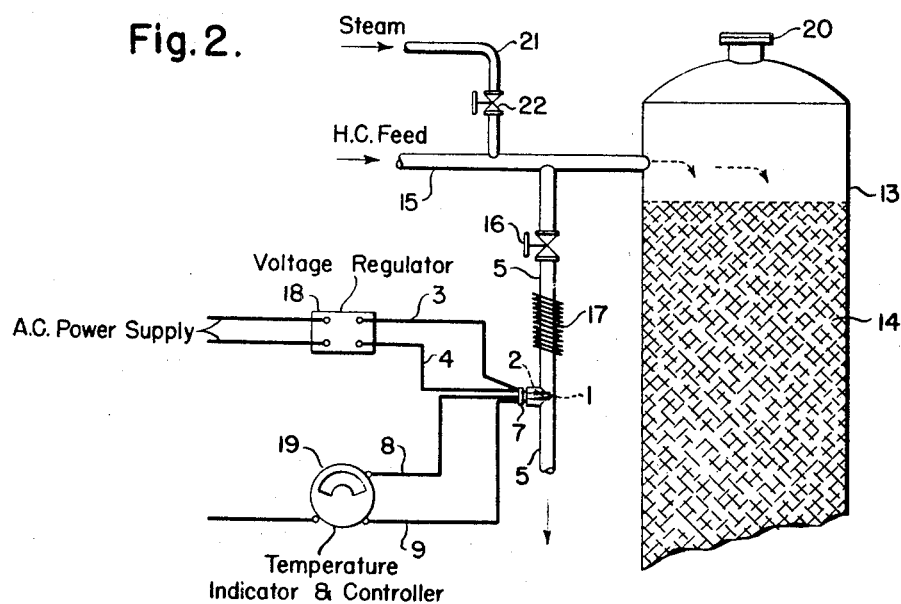

Figure 2 of the drawing is a diagrammatic elevational view of a chamber and contact bed, together with the measuring device, illustrating the use of the latter in connection with a contact bed for a hydrocarbon charge stream.

Referring now to Figure 1 of the drawing there is shown an elongated tubular member 1 having a closed end and a specially grooved or corrugated exterior. A pair of grooves, and a pair of ribs, are formed around the tubular member 1 to form two parallel helical grooves and two parallel and coextensive helical ribs. A pair of wicks 2 are wound continuously in the concave portion of the corrugated exterior. A wick may be of a glass cloth, or like construction impregnated with the particular hygroscopic material used in the contact bed of the reaction chamber. On the outer edges of the helical ribs or raised portions of the tubular member 1, there are wound a pair of wires 3 and 4. In this embodiment, the wires 3 and 4 are maintained separate as they pass longitudinally along the body of the tubular supporting member 1 and are wound the full length of the member 1, not touching or crossing one another. The width of the grooves and the size of the wicks 2 are proportioned so that the latter are wedged between the ribs and wires 3 and 4 whereby the wick contacts the wires and is positioned therebetween throughout the full length of the tubular unit.

Suitable supporting means is provided at the exterior end of the tubular member 1 for supporting the latter in a conduit or chamber 5. In this embodiment, the outer end of the member 1 is enlarged and has a threaded portion 6 which is adapted to screw into a suitable bushing 7. The bushing 7 is also threaded in order to be easily attached to a conduit or chamber 5.

In this embodiment, the tubular supporting member 1 is open or hollow so that a temperature sensitive element may be inserted therein for obtaining the temperature of the material within the wick 2. Various types of temperature sensitive devices may be used to obtain a substantially accurate reading of the wick temperature. In the embodiment shown, a thermocouple element, having wires 8 and 9 and suitable porcelain separators 10 and 11, is inserted into the interior of the member 1. However, a resistance thermometer coil, bi-metallic strip, liquid filled bulb, or other type of temperature measuring instrument of a standard type, may be inserted into the elongated tube in order to obtain the desired temperature reading, or alternately, to operate a suitable temperature control device, or devices, in an automatically controlled conversion unit. A suitable insulating type of plug 12 is placed within the outer portion 6 of the tubular supporting member 1, in order to maintain the thermocouple element in place within the interior of the device.

Referring now to Figure 2 of the drawing there is shown a chamber 13 having a contact bed 14 of hygroscopic material that is suitable for converting or treating a reactant stream being charged to the chamber through inlet line 15. In the preferred moisture control arrangement and operation of this invention, the device of Figure 1, having the wicks 2 with the hygroscopic material impregnated therein, which is the same as the material in bed 14, is mounted in a conduit 5 which connects with the feed line 15. Thus, a portion of the feed stream, regulated by control valve 16, may be partially cooled and passed over the wicks 2 of the control instrument. The feed stream may be cooled by suitable cooling fins 17 on line 5, or by other conventional heat exchange and cooling means connected with or encompassing the by-pass line 5.

An alternating current power supply connects with a voltage regulator 18, whereby a constant voltage supply is passed through wires 3 and 4 of the control device mounted within line 5. The voltage and current intensity being supplied adequate to pass current through the wick 2 as it picks up moisture from the gas and vapor stream passing over it and to provide adequate heat from electrical resistance to current flow within the material impregnated in the wick 2, and in turn dry out the hygroscopic material as may be necessary to establish an equilibrium in moisture content between the hygroscopic material and the water vapor within the feed stream. The temperature which results within the wick 2 is transmitted by means of the thermocouple, having dissimilar wires 8 and 9 to a suitable temperature and controlling apparatus 19, which may in turn operate means controlling the temperature of the feed stream, or alternately, means controlling the moisture content charged to the bed 14 of the reaction chamber.

A more specific example of the operation of the control device in combination with a hygroscopic catalytic contact bed, is with bed 14 of a pyrophosphoric acid catalytic material, maintained in a pellet form by means of a suitable binder or supporting material, and with cracked gases, primarily propylenes and butylenes, being charged to the chamber 13, to be polymerized thereto to form a high octane material. A suitable manhole or access nozzle 20 is provided at the top of the chamber 13 to charge the pellets thereto, and line 21, having control valve 22, connects to the feed line 15 in order to provide means for charging steam to the reaction zone.

Assuming a pre-determined temperature range of from about 380° F. to about 420° F. being a proper conversion temperature range for the particular feed stream and it is found that the temperature indicator 19 indicates about 410° F. to be the right temperature for the particular moisture content of the feed stream to maintain the catalyic material at the proper hydration, or moisture content, then suitable automatic or manual steps may be taken to adjust the temperature of the bed 14 to attain 410° F. While, if the proper temperature indicated for the contact bed is something less than 400° and that temperature is within the conversion temperature range, then the temperature of the feed stream may be controlled to lower the temperature and effect the indicated temperature.

Where an exact conversion temperature of say 400° F. is desired as an optimum condition, then the moisture content of the feed stream, or the amount of stream charged through line 21, must be decreased slightly in order to establish an equilibrium within the indicated device and within the bed 14 at the 400° F. temperature. Alternately, if the indicated proper temperature is lower than the fixed desired temperature of 400° F., then a greater amount of steam may be permitted to flow to the reaction chamber to increase the moisture content of the feed stream and the temperature controlled to bring about an equilibrium of the vapor pressure in the phosphoric acid bed and the water vapor in the feed stream at the 400° F. temperature.

A phosphoric acid catalyst bed in the conversion of a hydrocarbon stream must be maintained at the proper hydration in order to effect an efficient overall operation. When the catalyst becomes excessively dehydrated, the activity of the material is substantially decreased and the conversion efficiency drops correspondingly. On the other hand, if more moisture is passed to the catalyst bed than is necessary to maintain the proper equilibrium hydration, then the bed becomes soft and gummy with a loss in catalyst activity.

While Figure 2 of the drawing indicates the chamber type of catalytic reaction chamber, it may be noted that the device of Figure 1 and the control arrangement of Figure 2 may well be used in connection with a tubular type of reaction chamber. In the tubular type of arrangement, catalyst is maintained in banks of long tubes or pipes, with the latter being heated externally by steam or other heating medium to maintain the proper conversion conditions. Thus, the temperature controller 19 may in such an arrangement, operate to raise or lower the temperature of the heat exchange medium passing externally around the plurality of reaction tubes so as to maintain the desired equilibrium moisture content and temperature balance within each of the catalyst beds as determined by the hygroscopic material in the feed stream within a test zone.

The construction of the temperature measuring device of Figure 1, may of course be modified in various ways, however, in the preferred embodiment, the hygroscopic material is impregnated in a rope-like wick such as is shown and is wrapped around the tubular element 1 in a manner to be easily removed and replaced thereon. The wires 3 and 4 may be of any electrically conductive material which will not be subjected to corrosion by the particular feed stream, but, of a proper gage to carry the proper amount and frequency of electrical energy in the operation of the instrument.

I claim as my invention:

1. An apparatus for measuring the temperature at which a hygroscopic material reaches a water content in equilibrium with the moisture content of the gaseous medium contacting the material, which comprises in combination, an elongated tubular supporting member of a non-electrically conductive material, said member being helically grooved and having a pair of spaced and unconnected electrically conductive wires wrapped around said tubular member on the raised surface thereof, rope-like wicks impregnated with said hygroscopic material and wrapped around said tubular member in contact with and between said spaced pair of wires, means extending said wires through the end of said tubular member and means connecting a constant voltage supply thereto, a temperature sensitive element positioned within said tubular member in close proximity with said impregnated wick, whereby to measure the temperature within the latter resulting from the current flow therethrough.

2. The apparatus of claim 1 further characterized in that said rope-like wicks are detachably wound around said tubular member.

3. The apparatus of claim 1 further characterized in that said wicks are impregnated with anhydrous phosphoric acid.

4. An apparatus of the class described comprising in combination a reaction chamber containing a bed of hygroscopic material therein, an inlet conduit communicating with said chamber, a by-pass conduit connected to said inlet conduit, a tubular supporting member of non-electrically conductive material mounted in said by-pass conduit, said member being helically grooved and having a pair of spaced and unconnected electrically conductive wires wrapped around said tubular member on the raised surface thereof, rope-like wicks impregnated with said hygroscopic material and wrapped around said tubular member in contact with and between said spaced pair of wires, means extending said wires through the end of said tubular member and means connecting a constant voltage supply thereto, a temperature sensitive element positioned within said tubular member in close proximity with said impregnated wick, whereby to measure the temperature within the latter resulting from the current flow therethrough.

5. The apparatus of claim 4 further characterized in that said by-pass conduit is provided with cooling means.

HAROLD J. OBERDING.

REFERENCES CITED

The following references are of record in the file of this patent:

UNITED STATES PATENTS

| Number | Name | Date |
|---|---|---|
| 1,902,427 | Sawyer | Mar. 21, 1933 |
| 2,348,836 | Nagle | May 16, 1944 |
| 2,398,333 | Shoemaker | Apr. 9, 1946 |
| 2,427,291 | Marett et al. | Sept. 9, 1947 |